United States Patent
Feldman et al.

(10) Patent No.: US 8,330,619 B2
(45) Date of Patent: Dec. 11, 2012

(54) PULSE VERIFIER AND METHOD OF OPERATION

(75) Inventors: Charles Feldman, Flushing, NY (US);
Chi Yao Chen, Sunnyside, NY (US)

(73) Assignee: Consolidated Edison Company of New York, Inc., New York, NY (US)

( * ) Notice: Subject to any disclaimer, the term of this patent is extended or adjusted under 35 U.S.C. 154(b) by 282 days.

(21) Appl. No.: 12/783,152

(22) Filed: May 19, 2010

(65) Prior Publication Data

US 2011/0285544 A1    Nov. 24, 2011

(51) Int. Cl.
*G08C 19/38* (2006.01)
(52) U.S. Cl. .................. 340/870.3; 340/870.2
(58) Field of Classification Search ............. 340/870.05, 340/870.02, 3, 870.3; 702/57, 60, 61; 324/103 R, 324/103 P, 113
See application file for complete search history.

(56) References Cited

U.S. PATENT DOCUMENTS

| | | | |
|---|---|---|---|
| 4,439,764 A * | 3/1984 | York et al. | ............... 340/870.02 |
| 4,922,187 A | 5/1990 | Beverly, II | |
| 6,262,569 B1 | 7/2001 | Carr et al. | |
| 6,815,942 B2 | 11/2004 | Randall et al. | |
| 7,508,190 B2 | 3/2009 | Kagan et al. | |
| 7,683,605 B2 | 3/2010 | Kagan et al. | |
| 2002/0118119 A1* | 8/2002 | Hammond | ............... 340/870.02 |
| 2002/0161536 A1* | 10/2002 | Suh et al. | ............... 702/62 |
| 2005/0237047 A1* | 10/2005 | Voisine | ............... 324/76.11 |
| 2010/0064001 A1* | 3/2010 | Daily | ............... 709/203 |
| 2010/0179777 A1 | 7/2010 | Kagan et al. | |
| 2011/0082599 A1* | 4/2011 | Shinde et al. | ............... 700/295 |
| 2011/0246106 A1* | 10/2011 | Martin | ............... 702/61 |

* cited by examiner

*Primary Examiner* — Joseph Chang
*Assistant Examiner* — Jeffrey Shin
(74) *Attorney, Agent, or Firm* — Cantor Colburn LLP

(57) ABSTRACT

A device and method of counting pulse or switch contact signals over time from any commodity in various applications such as manufacturing and process control is provided. The device includes a pulse splitter relay that generates a first output pulse signal and a second pulse output signal. The first output pulse signal is transmitted to a recorder that receives the pulse signal and stores data such as date and time information when the pulse signal was received. The second output pulse signal is transmitted to a downstream system, such as a building management system for example. The data from the recorder and the downstream system may be compared to verify the pulse signals and identify potential sources for error.

16 Claims, 6 Drawing Sheets

PULSE VERIFIER AND METHOD OF OPERATION

BACKGROUND OF THE INVENTION

The subject matter disclosed herein relates to a device and method of verifying electrical pulses, and in particular to a device and method for verifying electrical utility meter pulses in parallel with a load monitoring system.

Many applications use pulse generators to transmit a pulse signal that indicates a unit of measurement. In an exemplary application, an electrical utility meter uses a relay to generate a pulse each time a dial on the utility meter rotates. By accumulating the number of pulses transmitted during a given time period, a usage parameter (e.g. kilowatt-hours) may be determined. The use of a pulse generator provides advantages in extending older technologies that may lack communications capability. The pulse generator further provides advantages by allowing a third party access to information from a metering device without having to provide a connection to the processing or communication circuitry of the meter. It should be appreciated that providing access to the communication circuitry of a meter may weaken security or create the risk of unauthorized access.

In an exemplary embodiment of an electrical utility meter, the pulse generator may be relay having two dry contacts (form C) or a single dry contact (form A), sometimes referred to as a KYZ or KY, KZ pulse output relay. Each time the meter disk or disk emulator (on digital meters) rotates a full turn, the relay changes state between the dry contacts. This change in state creates what can be considered a pulse signal on the relay output. By knowing the scaling of the disk rotation, the amount of electrical power consumed may be determined by counting the number of pulses generated over a period of time. The relay output for electrical meters is often used to provide the customer with a way to monitor their electrical usage in near real-time. It is common for electrical meters to have the pulse generating relay built in and connected with an external terminal block or wiring harness that allows the customer access to the pulses.

Another application is in energy usage consulting. Devices are commercially available that connect to the front of a utility meter and optically determine the rotation of the meter disk (on mechanical meters) or disk emulator/calibration pulses (on digital meters). The device then generates a pulse each time that a disk or disk emulator/calibration pulses completes a rotation. The energy consultant may then use this information to determine the impact of various changes that are made to the connected facility rather than waiting for the monthly utility account statement.

One problem that arises in these applications is when there is a discrepancy between the meter and the system that accumulates the pulses. It is difficult to trace the source of the error to determine if the error originates in the utility meter, or in the customer system.

Accordingly, while existing pulse systems are suitable for their intended purpose, there remains a need for improvements particularly in systems and methods for verifying the accuracy of the pulse system.

BRIEF DESCRIPTION OF THE INVENTION

According to one aspect of the invention, a device is provided having a first input. A pulse splitting relay having a second input is electrically coupled to the first input. The pulse splitting relay further includes a first output and a second output electrically coupled to the second input. A recorder is electrically coupled to the first output, the recorder further has a processor responsive to executable computer instructions when executed on the processor for receiving a first signal from the first output and storing data in memory in response to the first signal. The data may include a date and time when the first signal was received.

According to another aspect of the invention, a pulse verifying system is provided. The system includes a pulse source. A demark device is operably coupled to the pulse source, the demark device being adapted to receive a pulse signal from the pulse source and inhibit electrical power from transmitted from the demark device to the pulse source. A verifying device is operably disposed between the pulse source and the demark device. The verifying device includes a pulse splitting relay having a first input operably coupled to the pulse source, a first output and a second output, wherein the second output is operably coupled to the demark device. The verifying device further includes a recorder operably coupled to the first output, the recorder has a processor that is responsive to executable computer instructions when executed on the processor for storing data in memory in response to receiving a first signal from the first output, wherein the data includes a date and a time when the first signal was received.

According to yet another aspect of the invention, a method of verifying electrical pulses is provided. The method includes generating a first series of pulses with a pulse source, wherein each of the first series of pulses corresponds to a unit of measurement. The first series of pulses is transmitted to an input of a pulse splitting relay. A second series of pulses is generated with the pulse splitting relay in response to the pulse splitting relay receiving the first series of pulses. A third series of pulses is generated with the pulse splitting relay in response to the pulse splitting relay receiving the first series of pulses. The second series of pulses is transmitted to a recorder. A first data is stored with the recorder in response to receiving the second series of pulses, the first data includes a date and time when each of the second series of pulses was received by the recorder. The third series of pulses is transmitted to a first output.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of the invention provide advantages in allowing personnel to verify the accuracy or precision of pulse signals from a pulse generation source. Embodiments of the invention provide further advantages in monitoring pulse signals in parallel with an external system. Yet further embodiments of the present invention provide further advantages in locating the sources of error in a system using pulse signals. Still further embodiments of the invention provide advantages in being portable and transportable by a single person.

Figure 1:
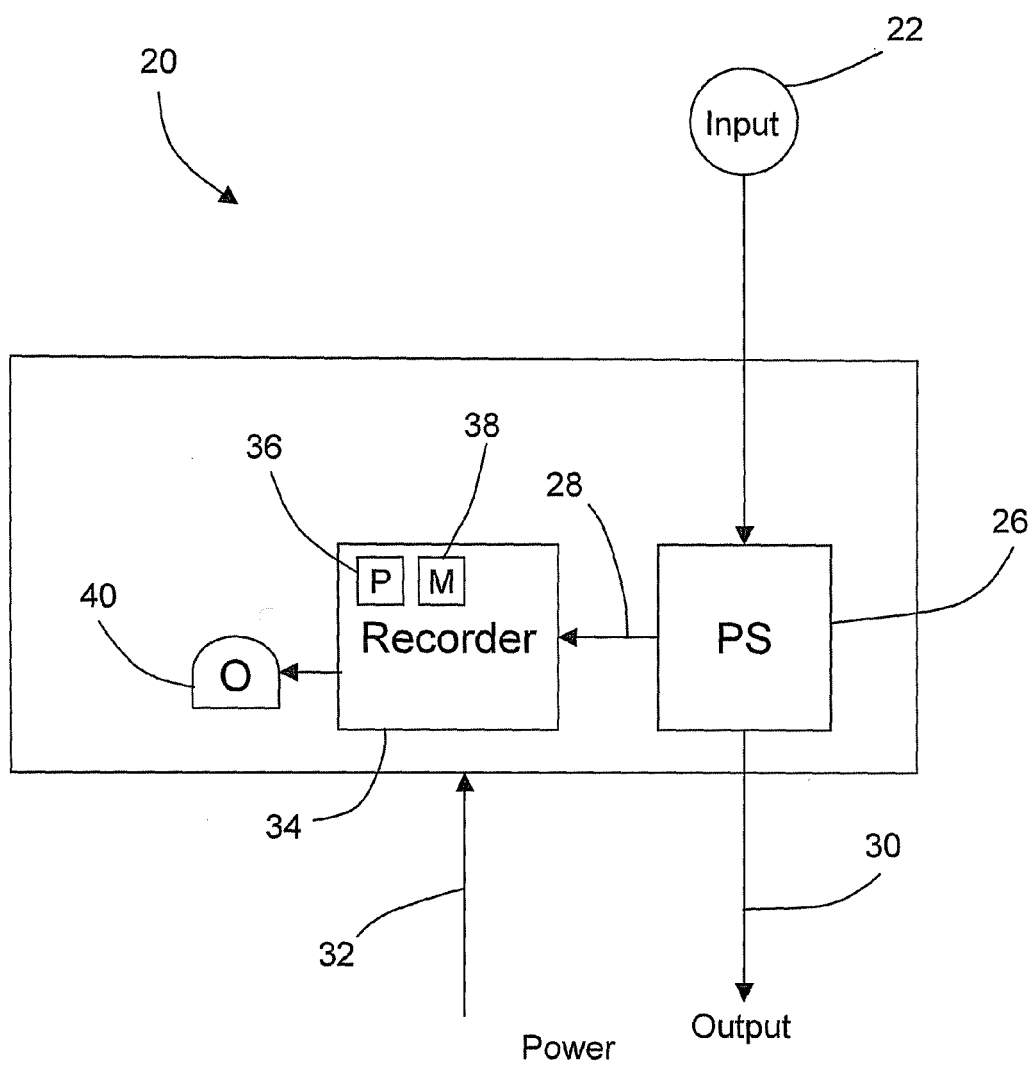
FIG. 1 is a block diagram of a pulse verifier in accordance with an embodiment of the invention.

Referring now to FIG. 1, an exemplary pulse verifier device 20 is illustrated. The device 20 includes an input 22 that is received from a pulse generation source, such as a dry contact relay 24 (FIG. 4) for example, that generates a series of signal pulses. The input 22 is connected to a pulse splitting relay 26. In the exemplary embodiment, the pulse splitting relay 26 is an isolation relay model "Sentry 30" produced by Austin International. The pulse splitting relay 26 accepts the signal from input 22 provides a first bistable output 28 and a second bistable output 30. In the exemplary embodiment, the pulse splitting relay 26 receives input electrical power 32 from an external source. The pulse splitting relay 26 isolates the output signals 28, 30 from the input 22 and creates a pair of output pulse signals that are substantially identical to the input pulse signal received from input 22.

The first output signal 28 is transmitted to a recorder 34. The recorder 34 includes a controller having a processor 36 and memory 38. In the exemplary embodiment, the recorder 34 is a utility grade data recorder, such as Model SSR-660 data recorder manufactured by Transdata, Inc. The recorder 34 is a suitable electronic device capable of accepting data and instructions, executing the instructions to process data and storing the results. The recorder 34 may accept instructions and data through a user interface, or other means such as by not limited to electronic data card, voice activation means, manually operable selection and control means, radiated wavelength and electronic or electrical transfer. In the exemplary embodiment, the recorder 34 includes an optical interface 40 that provides a connection with an external device, such as a laptop computer for example.

The recorder 34 is capable of converting the pulse signal from pulse splitting relay 26 into a digital record. In general, the recorder 34 accepts the data from the pulse splitting relay 26 and is given certain instructions for the purpose of associating the pulse signal data with one or more data, such as but not limited to time data and date data for example. The recorder 34 stores data in memory 38 so that it may be later received by an external device (not shown). In one embodiment, the recorder 34 includes, or is connected to a communications device, such as a cellular (CDMA, GSM) modem, a telephone modem, or a local area network for example. The memory 38 may include one or more types of memory, including random access memory (RAM), non-voltile memory (NVM) or read-only memory (ROM). The recorder 34 may further include one or more input/output (I/O) controllers or (not shown).

The recorder 34 includes operation control methods embodied in application code. These methods are embodied in computer instructions written to be executed by processor 36, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. In one embodiment, the recorder 34 includes an imbedded web server that allows service personnel to communicate with the recorder 34 from remote locations. Furthermore, the software can be independent of other software or dependent upon other software, such as in the form of integrated software.

In the exemplary embodiment, the device 20 receives a pulse signal from input 22. The pulse splitting relay 26 receives the pulse signal and generates a first output signal 28 and a second output signal 30. The second output signal 30 is transmitted to an external device or system, such as but not limited to another recorder, a building management system, an accumulator and the like. The first output signal is transmitted to the recorder 34. The pulse signal data is combined with a date and time data for when the pulse signal was received. The pulse signal data, and or the date and time data are stored in memory 38. Periodically, service personnel visit the device 20 and connect an external data collection device (not shown), such as a laptop computer for example, to the device 20. In the exemplary embodiment the external data collection device transmits a signal via the optical interface 40 to the recorder 34. When the signal is received via the optical interface 40, the processor 36 retrieves the pulse signal data and date and time data from memory 38 and transmits the data to the external data collection device via optical interface 40. In one embodiment, the data includes an accumulated pulse signal data. In another embodiment, the processor 36 converts the pulse data into a unit of measurement, such as kilowatt-hours for example.

Figure 2:
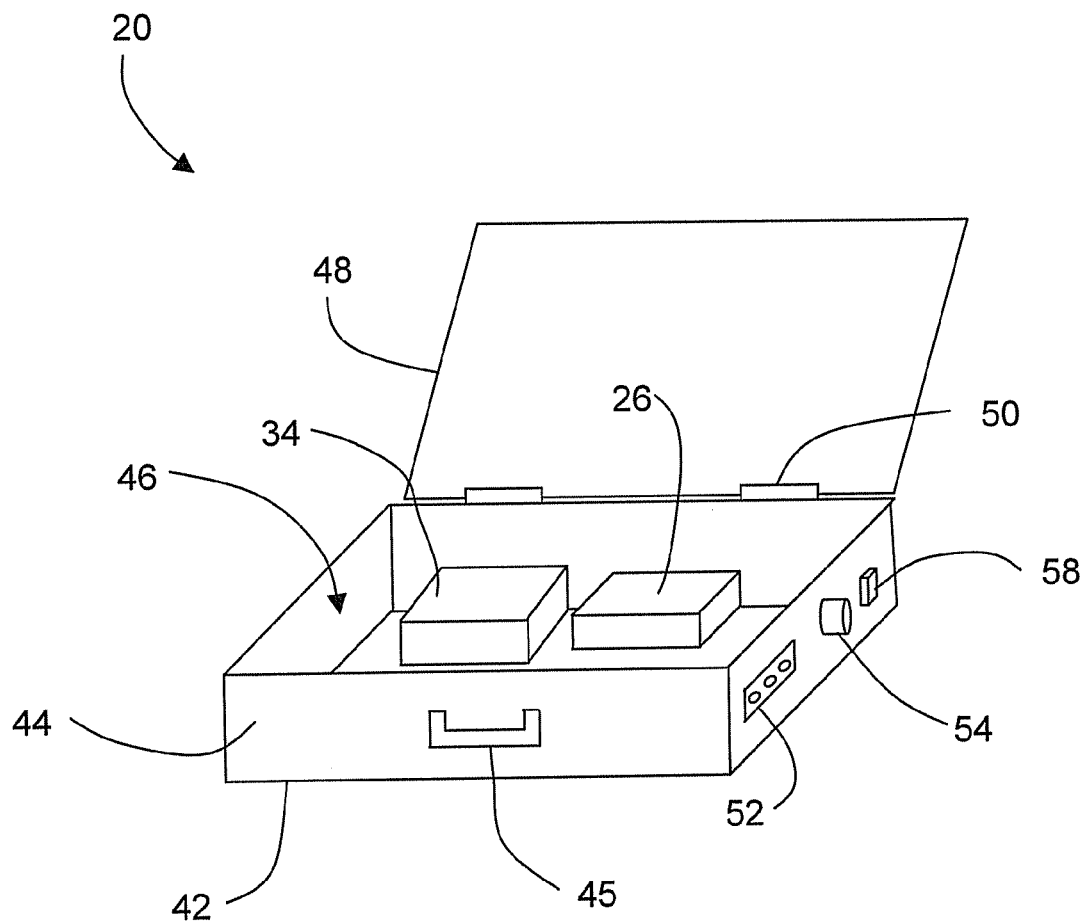
FIG. 2 is a perspective view illustration of a pulse verifier in accordance with an embodiment of the invention.
Figure 3:
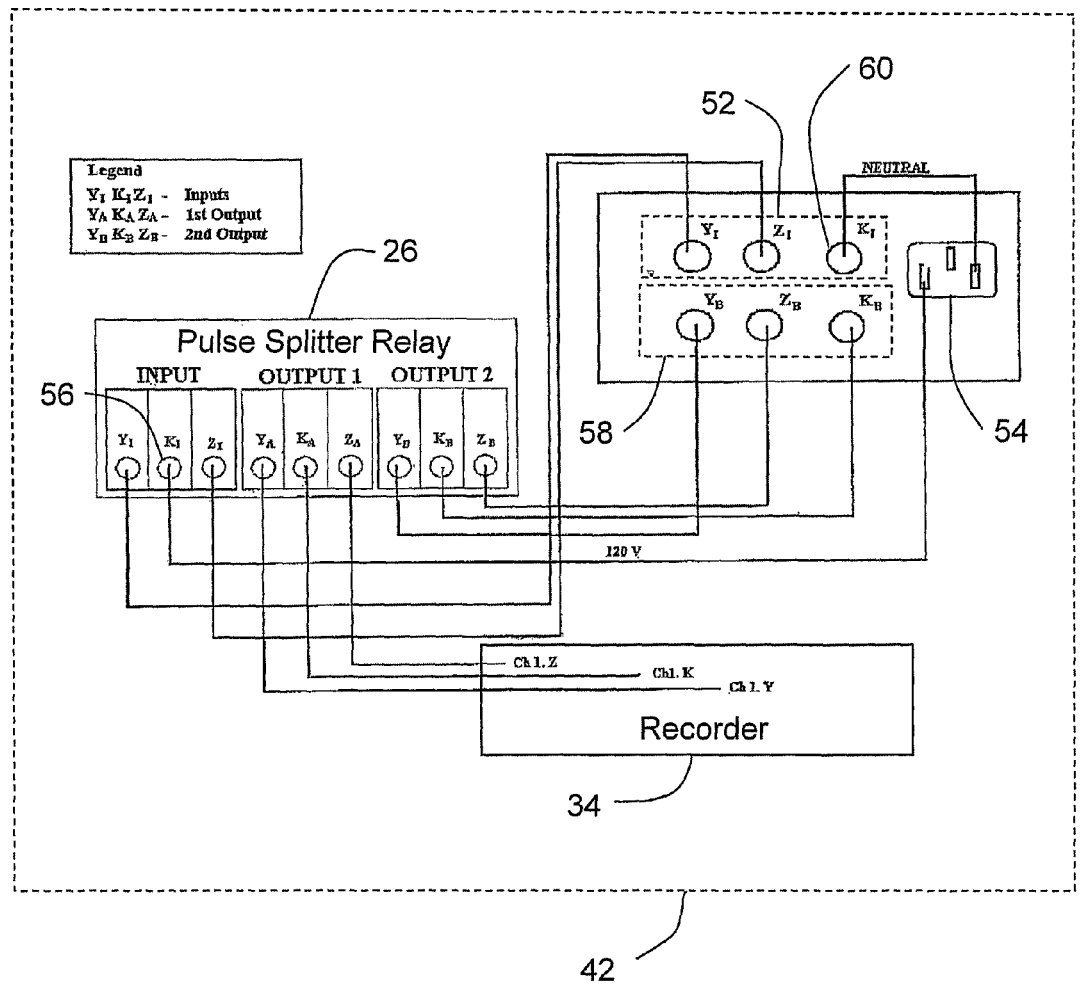
FIG. 3 is a schematic diagram of the pulse verifier of FIG. 2.

Another embodiment of a portable pulse verifier device 20 is illustrated in FIG. 2 and FIG. 3. In this embodiment, the device 20 includes a housing 42. The housing 42 includes a plurality of walls 44 that define rectangular parallelepiped box having a substantially hollow interior portion 46. One side of the housing is a movable lid or cover 48 that is coupled to the walls 44 by one or more hinges 50. In the exemplary embodiment, the cover 48 may include a lock to prevent unauthorized access to the recorder 34. In one embodiment, the housing 42 is the substantially the size of a briefcase and of a weight such that the device 20 may be carried by a single person. In one embodiment, the housing 42 includes a handle 45 on one wall. It should be appreciated that having a portable pulse verifier device 20 provides advantages in allowing service personnel to quickly deploy the device 20 to a desired location and allows the device 20 to remain at the installation site to collect data until the service personnel return.

Arranged within the interior portion 46 is the recorder 34 and pulse splitting relay 26. The recorder 34 and pulse splitting relay 26 are electrically coupled as illustrated in FIG. 3 to a terminal block 52 having post terminals for connection to the pulse source generator. Adjacent the input terminal block 52 is an electrical power inlet 54. In the exemplary embodiment, the electrical power inlet 54 is coupled to provide 120 Volt electrical power to the "K" line input terminal 56 on the pulse splitting relay 26 and on the "K" output post 60 of output terminal block 58. Since external power is provided to the pulse splitting relay 26, the received pulse signals may be replicated and transmitted without loss of signal quality or strength.

Figure 4:
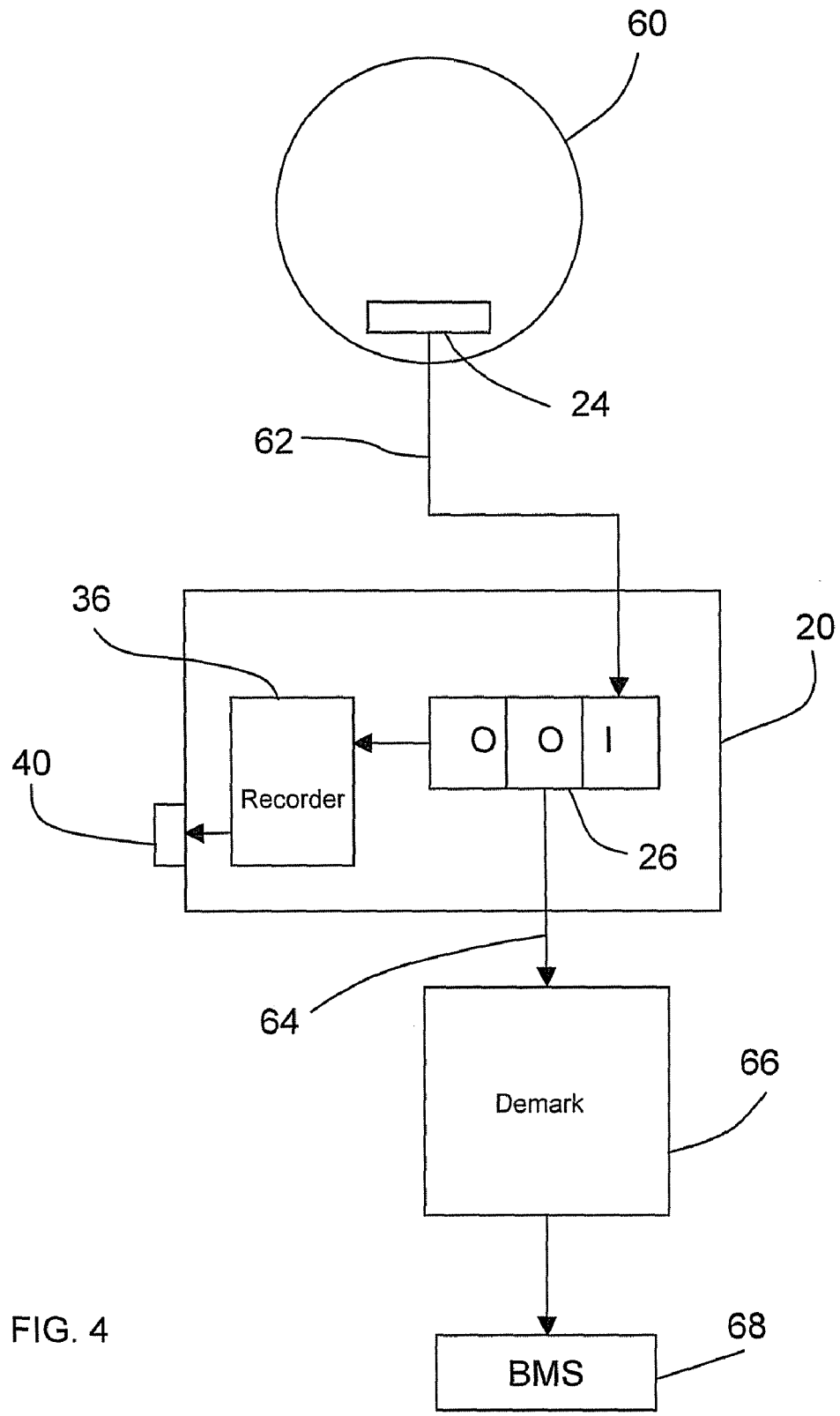
FIG. 4 is a block diagram of a pulse verifier in accordance with another embodiment.

An exemplary embodiment of an application using the device 20 with a utility meter 60 is illustrated in FIG. 4. Utility meters 60 are commonly used to measure and report the consumption of electrical power delivered to a customer. These meters 60 commonly provide a pulse signal output that allows an end customer or other third party to receive a signal that may be used for monitoring electrical consumption without waiting for a monthly statement from the utility or power provider. This pulse signal output is typically generated by a dry contact relay 24 that is connected with a terminal block or other wired connection that allows the customer to connect with the meter 60. The pulse signal may be used by the customer in a number of ways, such as during energy audits to determine to effect of different changes being made to the facility, or it may be used in conjunction with a building management system to allow monitoring of energy usage, or it may be used with a demand response program to monitor compliance during peak demand periods for example.

A connection 62, such as a three-wire connection for example, transmits the pulse signal from the dry contact relay 24 to the device 20. The device 20 receives the pulse signal as discussed herein above and generates a first output pulse signal that is transmitted to the recorder 34 and a second output pulse signal that is transmitted over connection 64 to a demark box 66. A demark box 66 is a standard device used in connection with utility meters that allows the pulse signal to pass into the customers system, such as to a building management system 68 for example. The demark box 66 provides a level of protection by allowing the pulse signal to pass into the system 68 but prevents or inhibits excess electrical current or voltage from being transmitted into the utility owned equipment. In essence, the demark box 66 keeps the customers system from impacting the operation (or damaging) the utility meter 60.

When arranged in the configuration illustrated in FIG. 4, the device 20 records the pulse signal in parallel with the transmission of the pulse signal to the demark box 66. If the data recorded by the system 68 is different from the device 20, then any errors in the pulse signal recorded by the customer would be originating on the customer's side of the demark box 66. Conversely, if the data recorded by the device 20 and that system 68 match, then the service personnel may have to examine the utility meter 60 as a possible source of error. It should be appreciated that it is undesirable to remove the utility meter 60 or replace it unnecessarily since once the utility meter 60 is removed, the utility meter 60 will typically need to be recertified before being redeployed to another installation. The recertification process for the utility meter is costly and time consuming unless justified with some indication that the utility meter 60 is faulty.

Figure 5:
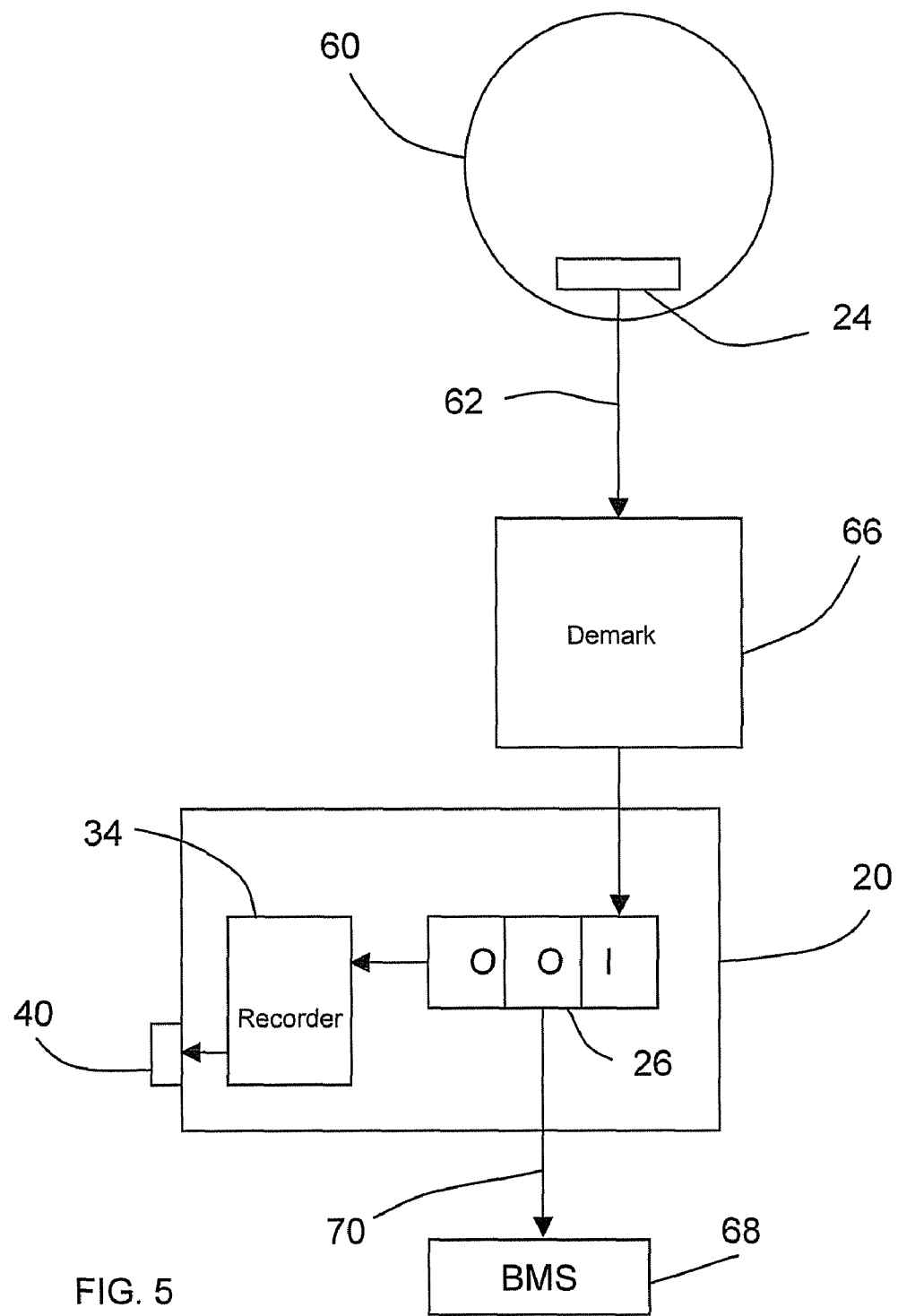
FIG. 5 is a block diagram of a pulse verifier in accordance with another embodiment; and, FIG. 6 is a block diagram of a pulse verifier in accordance with another embodiment.

Another embodiment of an application utilizing the device 20 with a utility meter 60 is illustrated in FIG. 5. In this embodiment, the pulse signal is transmitted over connection 62 to the demark box 66. The pulse signal passes through the demark box 66 over a connection 70 to the device 20. The device 20 receives the pulse signal and generates a first output pulse signal that is transmitted to the recorder 34 and a second output pulse signal that is transmitted to a downstream receiving system, such as building management system 68 for example. When arranged in this configuration, the data recorded by the recorder 34 and by the downstream system may be compared. If the data matches, then the component that is inducing an error may be the demark box 66 for example. If the data does not match, then the error may be introduced somewhere in the downstream system.

Figure 6:
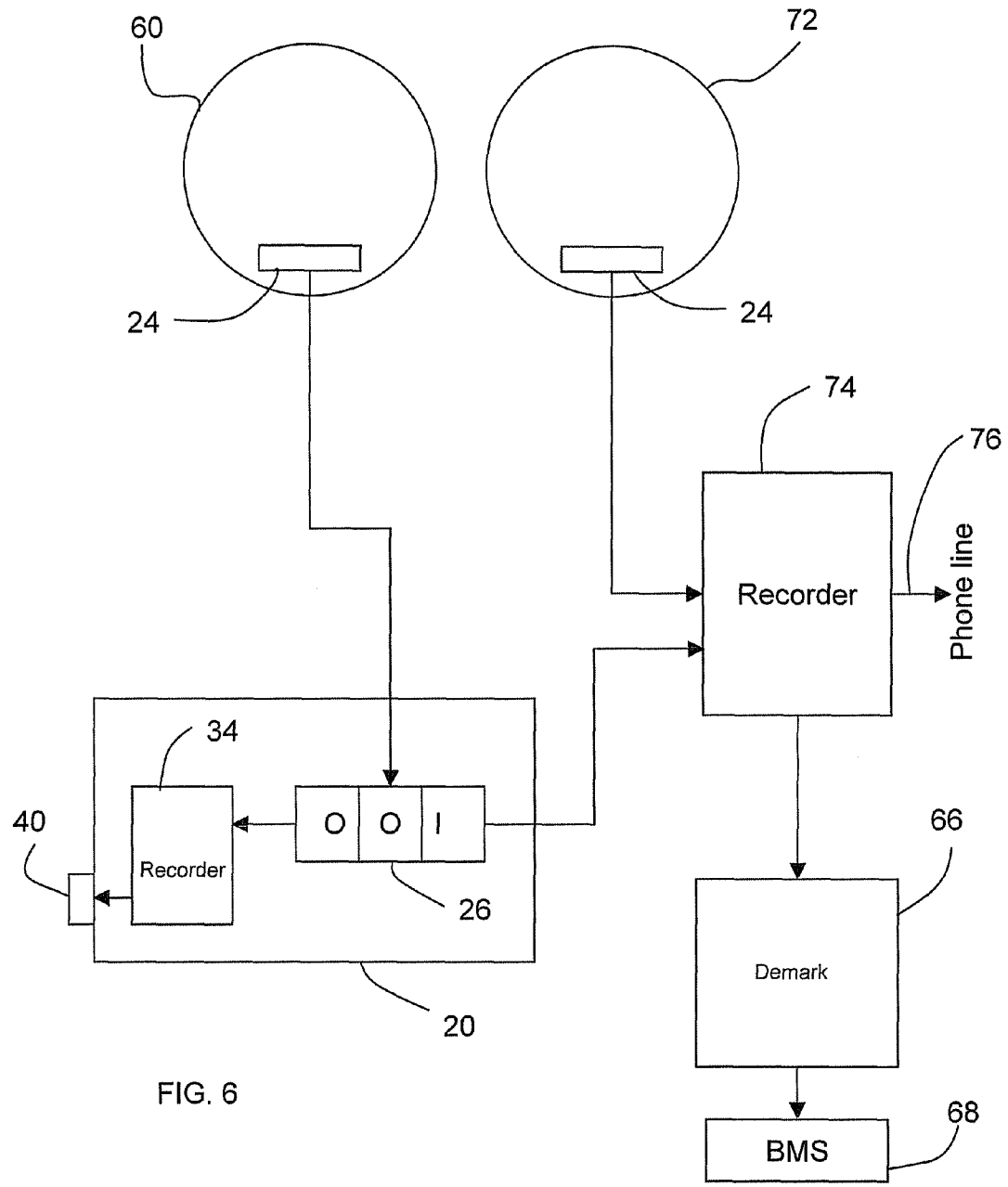

Yet another embodiment of an application utilizing the device 20 with multiple utility meters 60, 72 is illustrated in FIG. 6. In this embodiment, the application utilizes two utility meters to measure electrical consumption. This type of arrangement may be used in a building having multiple leaseholders for example where each meter is connected to an electrical service associated with each leased space. The embodiment further uses an external recorder 74 that aggregates the measurements from the utility meters 60, 72 and transmits the data to the utility, such as via a telephone connection 76 for example. The external recorder 74 then transmits the signal to the demark box 66 and to the system 68. In this embodiment, the device 20 is arranged between the utility meter 60 and the external recorder 74. The pulse signal from utility meter 60 is transmitted to the device 20 that transmits a first output pulse signal to recorder 34 and a second output pulse signal to the external recorder 74. In this configuration, any issue in the connection between the utility meter 60 and the external recorder 74 may be isolated and identified even though a second utility meter 72 is arranged in parallel.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), or erasable programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to record pulse signals in parallel with a system for verifying the accuracy or precision of a pulse source.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A device comprising:
a first input configured to receive an input signal from a pulse generation source;
a pulse splitting relay having a second input electrically coupled to said first input, said pulse splitting relay further having a first output and a second output electrically coupled to said second input, the pulse splitting relay being configured to output a first signal and a second signal through said first output and said second output respectively in response to receiving said input signal, said first signal and said second signal being substantially identical to said input signal;

a recorder electrically coupled to said first output, said recorder having a processor responsive to executable computer instructions when executed on said processor for receiving said first signal from said first output and storing data in memory in response to said first signal, said data including a date and time when said first signal was received.

2. The device of claim 1 further comprising a third output electrically coupled to said processor, wherein said processor is further responsive to executable computer instructions for transmitting said data to said third output in response to said first signal from said first output.

3. The device of claim 2 wherein said third output is an optical interface.

4. The device of claim 1 wherein said second input further comprises a first signal input, a second signal input and a power input, wherein said power input is adapted to receive 120 Volt electrical power.

5. A device comprising:
a first input;
a pulse splitting relay having a second input electrically coupled to said first input, said pulse splitting relay further having a first output and a second output electrically coupled to said second input;
a recorder electrically coupled to said first output, said recorder having a processor responsive to executable computer instructions when executed on said processor for receiving a first signal from said first output and storing data in memory in response to said first signal, said data including a date and time when said first signal was received;
wherein said second input further comprises a first signal input, a second signal input and a power input, wherein said power input is adapted to receive 120 Volt electrical power;
said first output further comprises a first signal output operably coupled to said first signal input, a second signal output operably coupled to said power input, and a third signal output operably coupled to said second signal input; and,
said second output further comprises a fourth signal output operably coupled to said first signal input, a fifth signal output operably coupled to said power input, and an sixth signal output operably coupled to said second signal input.

6. The device of claim 5 further comprising a housing having a plurality of walls that define a substantially hollow interior portion, a first wall of said plurality of walls being movable, wherein said pulse splitting relay and said recorder are arranged within said interior portion, wherein said first input is coupled to a second wall of said plurality of walls.

7. The device of claim 6 wherein said device has a size and weight to be carried by a single person.

8. A pulse verifying system comprising:
a dry contact relay;
a demark device operably coupled to said dry contact relay, said demark device being adapted to receive a pulse signal from said dry contact relay and inhibit electrical power from transmitted from said demark device to said pulse source; and,
a verifying device operably disposed between said dry contact relay and said demark device, said verifying device comprising:
a pulse splitting relay having a first input operably coupled to said pulse source, a first output and a second output, wherein said second output is operably coupled to said demark device, said pulse splitting relay being configured to output a first signal from the first output and a second signal from the second output in response to receiving an input signal from said dry contact relay, said first signal and said second signal being substantially identical to said input signal;
a recorder operably coupled to said first output, said recorder having a processor that is responsive to executable computer instructions when executed on said processor for storing data in memory in response to receiving said first signal from said first output, wherein said data includes a date and a time when said first signal was received.

9. The pulse verifying system of claim 8 wherein said recorder further comprises a third output electrically coupled to said processor, wherein said processor is further responsive to executable computer instructions for transmitting said data to said third output in response to said first signal from said first output.

10. The pulse verifying system of claim 9 wherein said first input further comprises a first signal input electrically coupled to said dry contact relay, a power input electrically coupled to a power source, and a second signal input electrically coupled to said dry contact relay.

11. A pulse verifying system comprising:
a pulse source;
a demark device operably coupled to said pulse source, said demark device being adapted to receive a pulse signal from said pulse source and inhibit electrical power from transmitted from said demark device to said pulse source; and,
a verifying device operably disposed between said pulse source and said demark device, said verifying device comprising:
a pulse splitting relay having a first input operably coupled to said pulse source, a first output and a second output, wherein said second output is operably coupled to said demark device;
a recorder operably coupled to said first output, said recorder having a processor that is responsive to executable computer instructions when executed on said processor for storing data in memory in response to receiving a first signal from said first output, wherein said data includes a date and a time when said first signal was received;
wherein said recorder further comprises a third output electrically coupled to said processor, wherein said processor is further responsive to executable computer instructions for transmitting said data to said third output in response to a second signal from said third output;
wherein said first input further comprises a first signal input electrically coupled to said pulse source, a power input electrically coupled to a power source, and a second signal input electrically coupled to said pulse source;
wherein said first output further comprises a first signal output operably coupled to said first signal input, a second signal output operably coupled to said power input, and a third signal output operably coupled to said second signal input; and,
wherein said second output further comprises a fourth signal output operably coupled to said first signal input, a fifth signal output operably coupled to said power input, and a sixth signal output operably coupled to said second signal input.

12. The pulse verifying system of claim 11 wherein said verifying device is removably coupled between said pulse source and said demark device.

13. The pulse verifying system of claim 12 wherein said pulse source is an electrical utility meter.

14. A method of verifying electrical pulses comprising:
generating a first series of pulses with a pulse source, wherein each of said first series of pulses corresponds to a unit of measurement;
transmitting said first series of pulses to an input of a pulse splitting relay;
generating a second series of pulses with said pulse splitting relay in response to said pulse splitting relay receiving said first series of pulses;
generating a third series of pulses with said pulse splitting relay in response to said pulse splitting relay receiving said first series of pulses;
transmitting said second series of pulses to a recorder;
storing a first data with said recorder in response to receiving said second series of pulses, said first data including a date and time when each of said second series of pulses was received by said recorder;
transmitting said third series of pulses to a first output;
transmitting said first data to a second output in response to receiving a signal from said second output;
wherein said pulse source is an electrical utility meter;
transmitting said third series of pulses from said first output to a building management system;
generating a second data in response to receiving said third series of pulses, wherein said second data includes a date data and a time data when each of said third series of pulses was received by said building management system; and,
comparing said first data and said second data.

15. The method of claim 14 further comprising providing a housing with a substantially hollow interior portion, wherein said pulse splitting relay and said recorder are arranged within said housing.

16. The method of claim 14 wherein said second output is an optical interface.

* * * * *